United States Patent [19]

Cox

[11] Patent Number: 5,417,540
[45] Date of Patent: May 23, 1995

[54] CARGO CONTAINER HANDLING AND TRANSPORT SYSTEM

[76] Inventor: Henry Cox, 141 Glass Hill Dr., Conway, S.C. 29526

[21] Appl. No.: 144,036

[22] Filed: Nov. 1, 1993

[51] Int. Cl.$^6$ ............................................. B60P 1/64
[52] U.S. Cl. ................................. 414/495; 414/498; 414/537
[58] Field of Search ................ 414/495, 498, 537; 410/80, 81, 90, 91; 280/763.1, 764.1, 765.1, 766.1

[56] References Cited

U.S. PATENT DOCUMENTS

| | | | |
|---|---|---|---|
| 1,329,956 | 2/1920 | Calataynd et al. | 414/498 |
| 1,425,965 | 8/1922 | Hocke | 414/498 X |
| 2,478,578 | 5/1948 | Gottshall | 410/81 |
| 2,934,373 | 4/1960 | Doty, Jr. | 414/498 |
| 2,958,538 | 11/1960 | Norris et al. | 414/498 |
| 3,119,503 | 1/1964 | Herpich et al. | 414/498 X |
| 3,152,709 | 10/1964 | Fowler . | |
| 3,499,562 | 3/1970 | Phillips . | |
| 3,520,433 | 7/1970 | Blackburn | 414/498 |
| 3,619,007 | 11/1971 | Phillips . | |
| 3,722,948 | 3/1973 | Walsh et al. . | |
| 3,724,697 | 4/1973 | Arvidsson | 414/498 X |
| 3,730,366 | 5/1973 | Berends | 414/495 |
| 3,817,413 | 6/1974 | Ham . | |
| 3,825,137 | 7/1974 | Mackrill et al. . | |
| 3,995,760 | 12/1976 | Burgdorf et al. | 414/498 |
| 4,000,924 | 1/1977 | Blasingame | 280/766.1 X |
| 4,053,073 | 10/1977 | Franchin | 414/498 X |
| 4,076,299 | 2/1978 | Dalton | 414/498 X |
| 4,089,539 | 5/1978 | Berger . | |
| 4,227,843 | 10/1980 | Damm | 414/498 X |
| 4,339,148 | 7/1982 | Smith et al. . | |
| 4,382,733 | 5/1983 | Rodgers . | |
| 4,629,085 | 12/1986 | Weitefeld . | |
| 4,746,262 | 5/1988 | Anderson | 414/495 |
| 5,213,458 | 5/1993 | Preller et al. | 414/498 X |
| 5,281,072 | 1/1994 | Patourillard et al. | 414/498 X |

FOREIGN PATENT DOCUMENTS

| | | | |
|---|---|---|---|
| 1577274 | 6/1969 | France | 414/498 |
| 2031330 | 3/1972 | Germany | 414/498 |
| 169444 | 2/1982 | Netherlands | 414/495 |
| 700486 | 12/1953 | United Kingdom | 414/498 |

OTHER PUBLICATIONS

European Intermodal Products LTD, Enterprise Works Aldwarke Lane, Rotherham S65 35R United Kingdom, Catalogue.
Mat Jack, Indianapolis Industrial Products, Inc. 1428 Sadlier Circle, East Drive, Indianapolis, Ind., 46239 The MatJack Advantage, High Pressure Air Bags.
JOST International, Corp., P.O. Box 327, Grand Haven, Mich. 49417, CYS Brand ISO Corner Castings.

*Primary Examiner*—David A. Bucci
*Attorney, Agent, or Firm*—Dowell & Dowell

[57] ABSTRACT

A system for hauling cargo containers which includes elevatable frames on which the containers are supported during transportation, loading and unloading of the containers. The frames are designed to be either directly mounted to conventional trailers or other transport vehicles or interlocked to alignment members mounted to such vehicles. The frames include support legs which are movable outwardly and pivotable vertically so as to support the frames in elevated relationship to the transport vehicles. Lifting devices are mounted on the frames to raise and lower the frames relative to the vehicles so that the containers may be loaded or unloaded relative to the vehicles without supplemental lifts or cranes. In a separate embodiment, the transport vehicles include lifting devices for elevating the frames for purposes of loading or unloading.

27 Claims, 13 Drawing Sheets

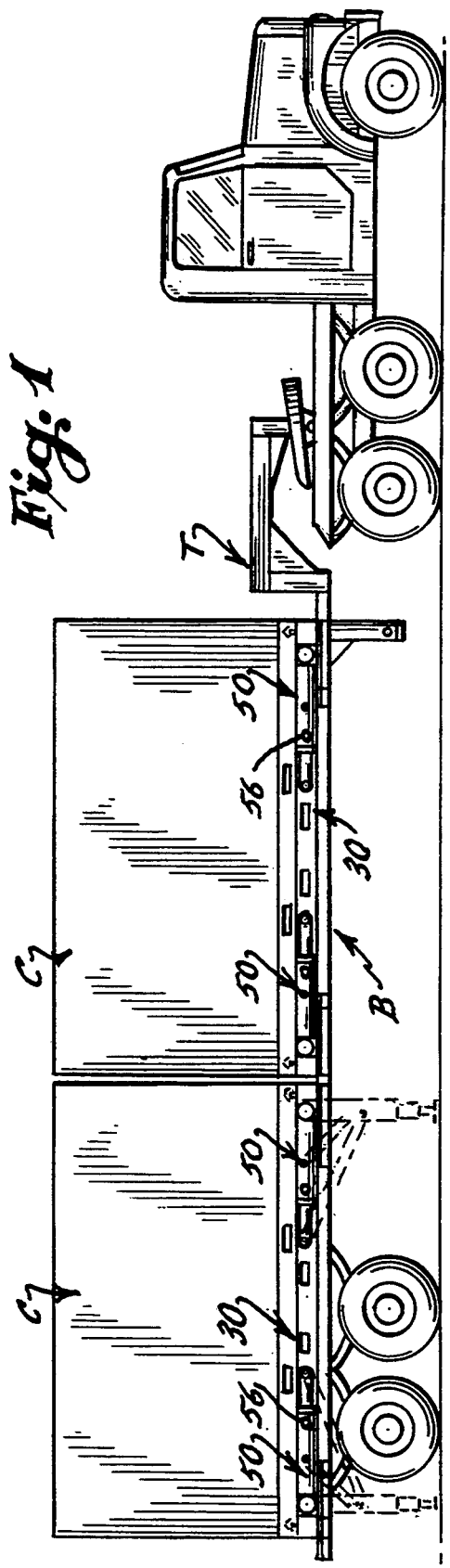
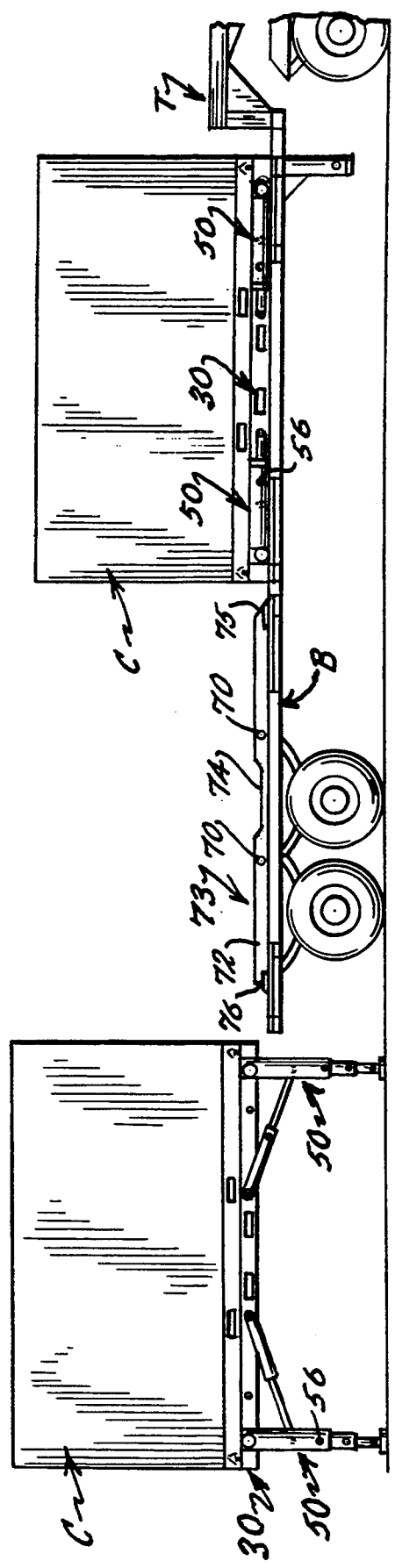

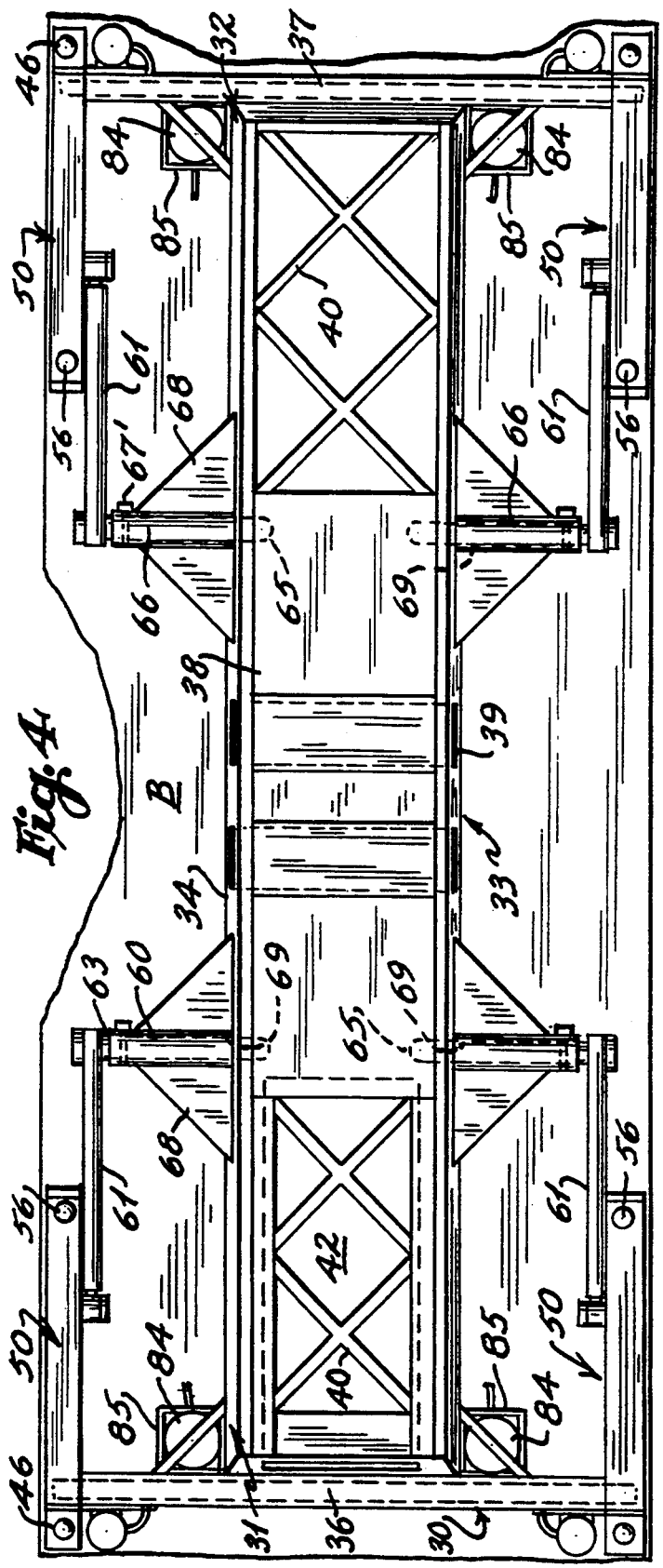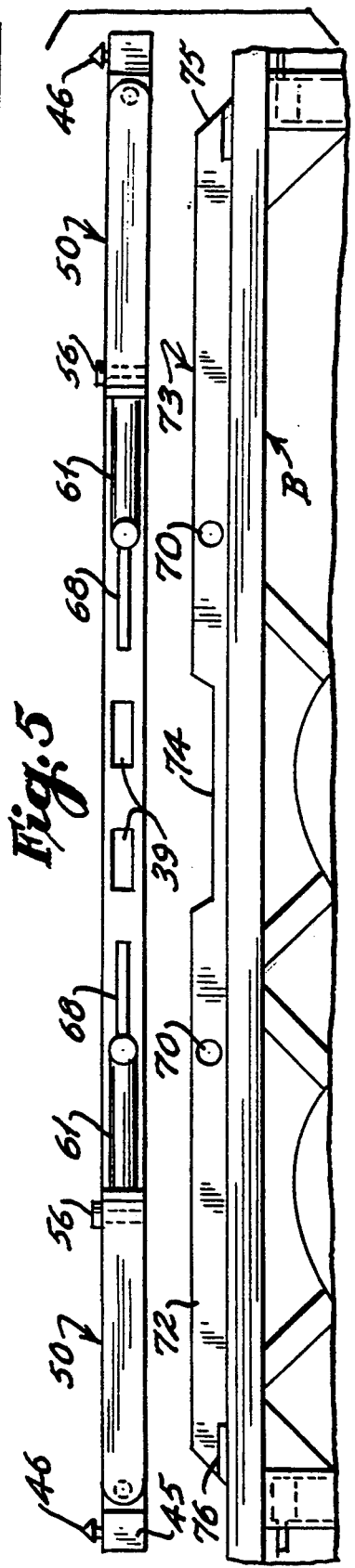

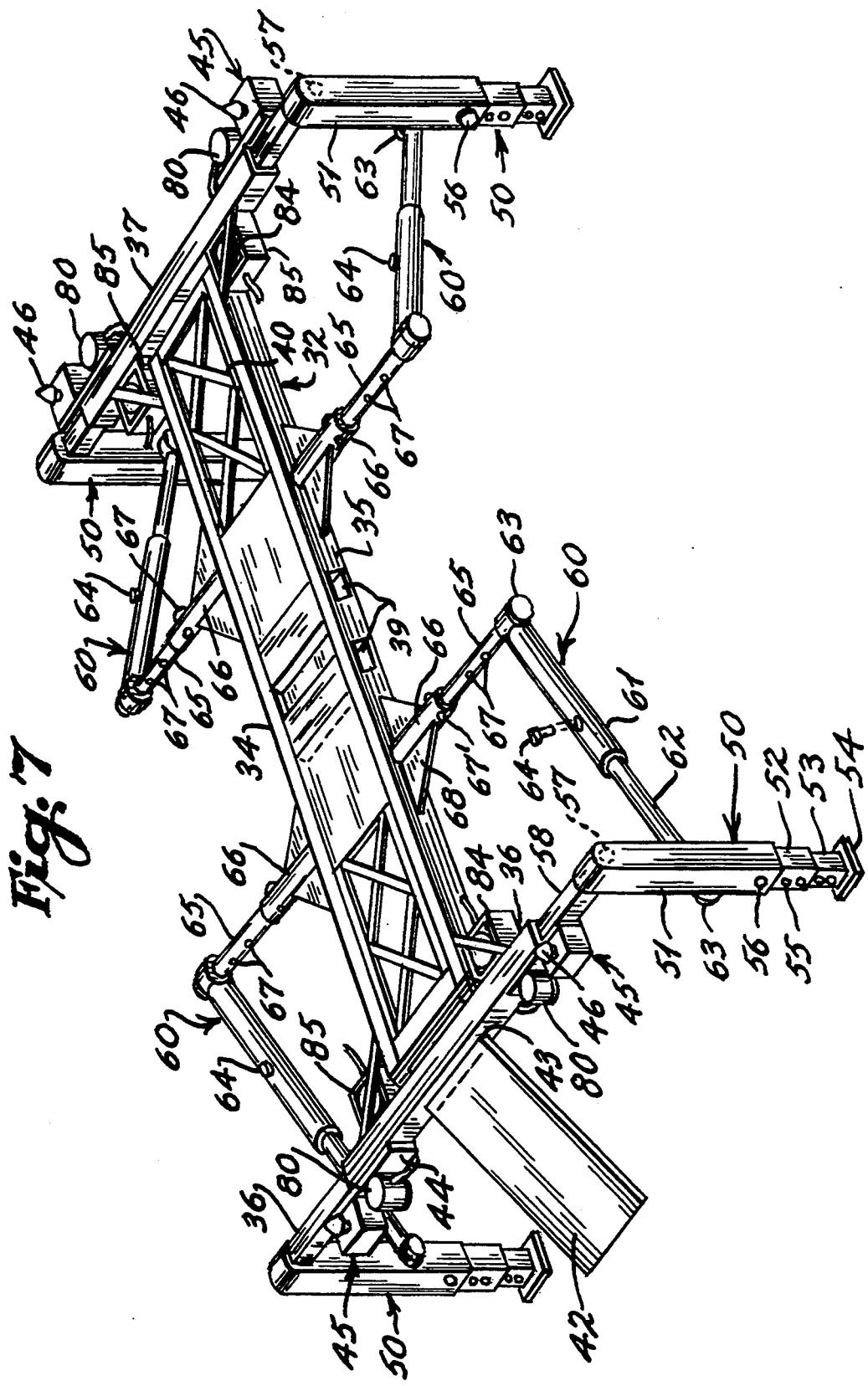

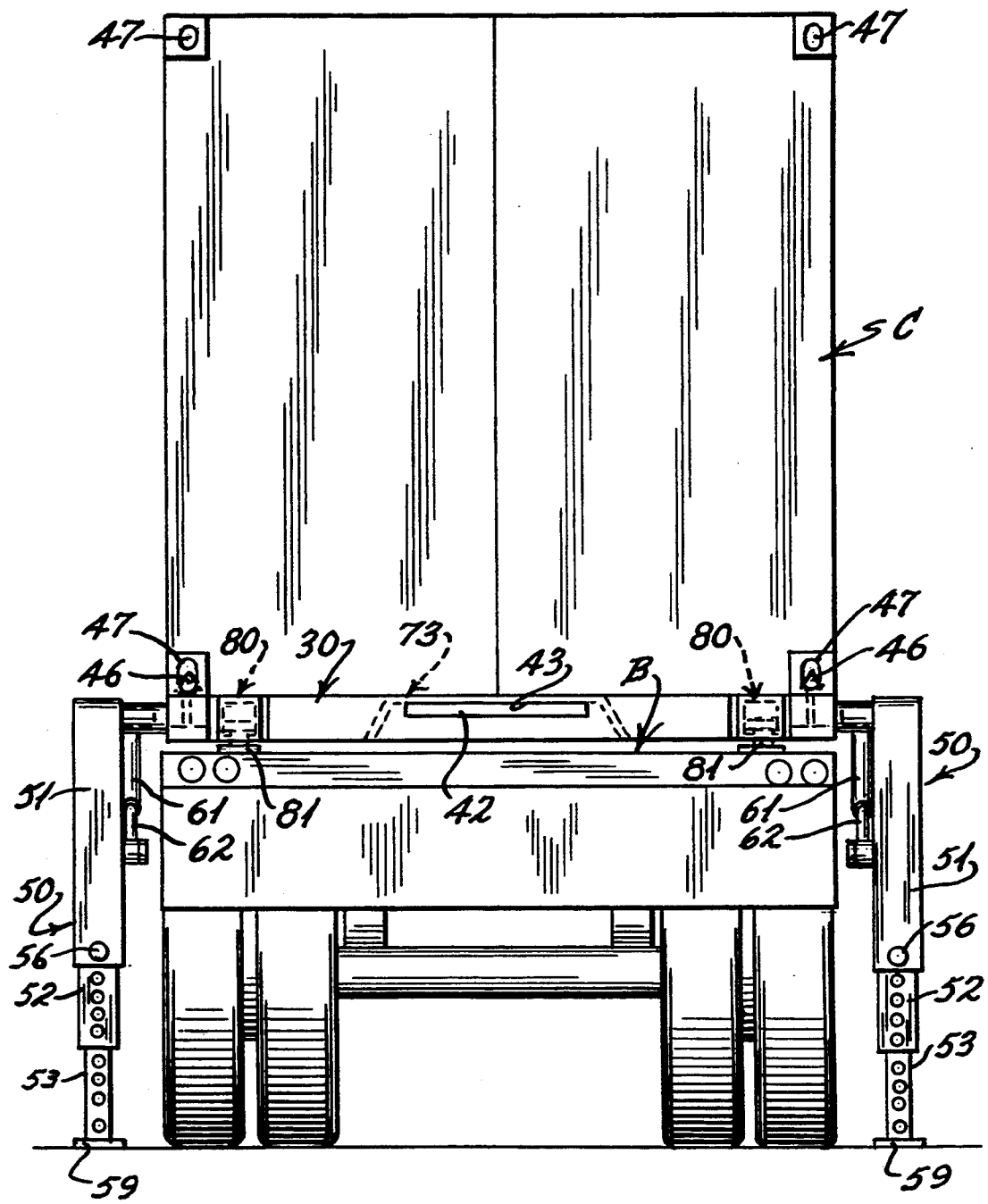

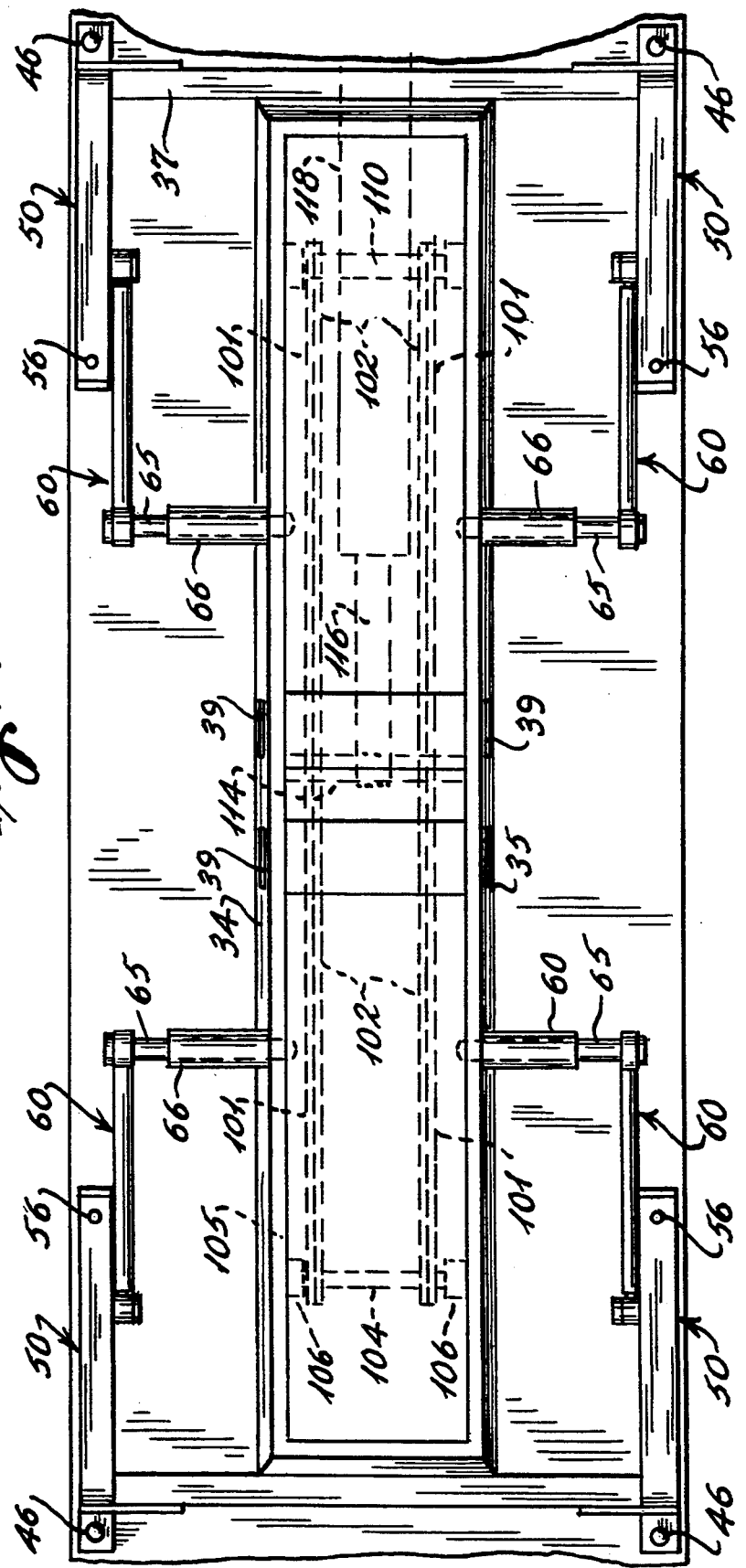

CARGO CONTAINER HANDLING AND TRANSPORT SYSTEM

BACKGROUND OF THE INVENTION

1. Field of the Invention

This invention is generally directed to systems for transporting, storing and supporting cargo containers of the type utilized in local and long distance shipping and warehousing of bulk goods or freight and more particularly to such a system which incorporates support frames which are interlockable with the shipping containers and which serve to support the shipping containers when unloaded from a transporting vehicle such as a flat bed truck, trailer, water vessel or railroad car. In one embodiment of the present invention, the frames are designed to be self-elevating with respect to the transporting vehicle so that the frames may be raised and lowered in order to permit a plurality of legs associated with the frames to be extended horizontally and then vertically to support the containers above the bed of the transporting vehicle. After elevation, the vehicles may be simply driven from under the frames and containers. Thus, the containers are loaded or unloaded without the need of supplemental elevating equipment such as hoists, cranes or forklifts.

In the preferred embodiments of the present invention, the frames are interlocked with alignment cradles which are mounted to a transport vehicle. In alternate embodiments, the cradles may be carried by lift assemblies so that the cradles serve to elevate the support frames and shipping containers relative to the transporting vehicle.

In yet other embodiments of the present invention, specialized trailers may be incorporated which further include pneumatic or hydraulic leveling devices for insuring that the load beds of the vehicles are retained in a horizontal position during loading and unloading of the support frames.

2. History of the Related Art

Due to the cost associated with shipping goods not only locally but long distance, including internationally, and due to the need to standardize the manner in which freight is warehoused or shipped, many goods are transported in large metallic shipping containers. The shipping containers are conventionally loaded and unloaded with respect to a transport vehicle by the use of forklifts or cranes which raise and lower the containers relative to the supporting deck or bed of the transporting vehicle. Unfortunately, such systems require that loading and unloading equipment be available at each point at which a container is to be loaded or unloaded from a transporting vehicle. This limits the available points of delivery or pickup for the goods being shipped or requires that the transporting vehicle be retained in an area where goods are to be loaded or unloaded thereby increasing shipping cost by requiring the vehicle to be retained in a fixed location for often lengthy periods of time. By way of example, if a shipping container is to be loaded with household goods for an individual moving from one area to another, it is conventionally necessary for a truck having a trailer to remain at the point of loading until the shipping container is loaded. During this period of time, the motor vehicle and trailer are not being used for their primary purpose of hauling freight from one location to another. This radically increases the cost of shipping.

In order to overcome the deficiencies with respect to such conventional shipping techniques, shipping systems have been developed which allow shipping containers to be unloaded from the transporting vehicle at a point of delivery or at a point of loading until the container is ready for further shipment. In U.S. Pat. No. 3,817,413 a de-mountable load carrying body for a vehicle is disclosed which includes a container or body which is supported by longitudinal rails mounted to the vehicle. The container or body is rollable with respect to the vehicle frame and includes vertically positionable legs which support the body when it is rolled from the frame. Unfortunately, this type of transport system requires specialized vehicles and specialized containers which will allow the container to be rolled relative to the frame of the vehicle. In addition, this type of system requires that the demountable load carrying body be exactly aligned with the vehicle both vertically and horizontally during loading and unloading, which in a practical sense, would rarely be possible.

Another example of a detachable truck bed or body is disclosed in U.S. Pat. No. 4,076,299 to Dalton. This patent discloses a truck bed which is elevated from the frame of a truck by the use of hydraulic cylinders. After the bed has been raised a plurality of legs are lowered into engagement with the ground thereby stabilizing the bed relative to the truck frame. The truck is thereafter driven from under the truck bed. Unfortunately, with this type of system, it is necessary to provide the hydraulic cylinders to the truck frame in order to enable the lifting of the truck bed and thus the truck bed could not be utilized as a support frame on conventional shipping vehicles including railway flat cars or flat bed trucks. In addition, the patent does not provide for a precise alignment between the removable truck bed and the truck frame.

Another type of container transport system is disclosed in U.S. Pat. No. 4,053,073 to Franchin. In this system, the containers which are to be transported by motor vehicle are provided with hydraulic cylinder lifts at each corner of the container. In this manner when it is desired to elevate the container from the truck bed, the cylinders are activated and the container is raised. Unfortunately, with this type of system, the cylinders also function as the support legs for the container. Therefore, extremely large hydraulic cylinders must be provided so as to enable the containers to be lifted from a trailer bed of conventional height which may be a height of approximately 51″ or more. Thereafter, the fluid cylinders must support the weight of the cargo container for extended periods of time. Also, such a system does not allow for any maneuvering space between the vehicle bed and the container. Such a system would be highly impractical and expense.

In U.S. Pat. No. 3,995,760 to Burgdorf et al., a motor vehicle container transport and support system is disclosed wherein the containers are supported on frames which are detachably mounted to a cradle mounted to a vehicle bed such as the bed of a tractor trailer. This patent discloses that the cradle provides a means for aligning the main support frame with respect to the vehicle during loading and unloading. The patent further discloses the use of an interlock system for securing the containers to the frame. When it is desired to release the frame from a motor vehicle, the legs of the frame are first extended outwardly, in outrigger fashion, with respect to the frame and then the legs lowered vertically. Once the legs are in contact with the ground the vehicle may be moved allowing a sliding motion to be established between the main frame and the support frame. Unfortunately, this type of sliding between the main frame and the cradle is not practical and a great deal of stress is imparted to the support legs during loading and unloading of the frame with respect to the transport vehicle. With this system, the frame for supporting the shipping container is locked to the cradle by locking mechanisms similar to that provided for locking the container to the main frame. This requires separate activation of a plurality of locking mechanisms to secure the main frame to the cradle.

Some additional examples of prior art systems are disclosed in U.S. Pat. Nos. 2,478,578 to Gottshall, 3,119,503 to Herpich et al., 3,152,709 to Fowler, 3,722,948 to Walsh et al., 3,724,697 to Arvidsson, 4,000,924 to Blasingame, 4,089,539 to Berger, and 4,339,148 to Smith et al.

SUMMARY OF THE INVENTION

A method and apparatus for transporting and supporting cargo containers utilized to ship various goods and freight wherein the containers are hauled by various transport vehicles including tractor trailers. The system includes an elevatable frame having an upper surface on which at least one cargo container may be supported and a lower surface. The frame includes opposite end portions and a central portion. A pair of legs are pivotably mounted in outrigger fashion to opposite sides of the end portions of the frame and are reinforced by struts which are also telescopically mounted relative to the frame. In a first embodiment, lift members are provided on the frame for engaging the bed of the transport vehicle so as to selectively elevate the frame with respect to the bed. Locking members are provided extending from the upper surface of the frame which are engagable with cooperating locking members mounted on the containers so that, when the containers are mounted on the frames, they are positively secured thereto. In the preferred embodiment either hydraulic or pneumatic controls are provided for connecting a source of pneumatic or hydraulic fluid with the lift members carried by the elevatable frame.

In the preferred embodiments, an alignment cradle is mounted below the main frame and includes a pair of elongated tapered centering side rails which are cooperatively received between elongated tapered centering rails provided on the lower surface of the main frame. The opposing centering rails on both the cradle and the main frame will ensure appropriate alignment of the main frame relative to a vehicle to which the cradle is mounted.

In the preferred embodiments of the present invention, the main frame is automatically interlocked with the alignment cradle by way of locking pins which are connected to the struts which are mounted to the legs associated with the main frame. When the legs and struts are retracted into a transport position, the pins connected thereto will pass through openings in the alignment cradle thereby locking the alignment cradle to the main frame.

In an alternative embodiment, the alignment cradle is mounted to a pneumatic or hydraulic scissor lift assembly which is mounted to the bed of a trailer or other motive source. In this embodiment the main frame and the container mounted thereto are raised by the alignment cradle as the cradle is elevated by the scissor lift assembly. Thereafter the legs associated with the main frame may be brought into a supporting vertically oriented position. As with the other embodiments, as the legs are brought into a support position, the locking pins secured to the reinforcing struts associated with each leg will be removed from the openings in the alignment cradle thereby allowing the alignment cradle to be released and lowered relative to the main frame.

In yet another embodiment of the present invention, a conventional or specialized trailer for hauling the frames and containers associated with the present transport system may include hydraulic or pneumatic lifts mounted to the undercarriage thereof for use in leveling the trailer for purposes of loading and unloading containers mounted to the support frames where the terrain is uneven.

It is the primary object of the present invention to provide a system for transporting, storing, and supporting cargo containers which allows the containers to be removed from conventional transport vehicles without the aid of supplemental hoist or elevating equipment, such as forklifts, so that the containers may be loaded and unloaded with respect to a transport vehicle at substantially any location leaving the vehicle free for further use while the container is loaded, emptied, or otherwise left for storage purposes.

It is yet a further object of the present invention to provide a system for transporting and supporting conventional cargo containers wherein the containers are securely locked to support frames which frames themselves are automatically locked to a transport vehicle when the legs of the frames are retracted to a travel position.

It is another object of the present invention to provide a system for transporting and supporting cargo containers which allows for the loading and unloading of containers even in remote areas of uneven terrain while ensuring that the cargo containers are retained in substantially level orientation for purposes of loading and unloading.

It is another object of the present invention to provide a system for transporting cargo containers which allows the containers to be left at various sites for storage, loading or unloading while leaving the transport vehicles free to haul additional containers or goods until such time as the containers must be transported to another location thereby significantly reducing vehicle down time and decreasing costs associated with the transport and handling of goods.

It is also an object of the present invention to provide a system for supporting cargo containers which enables the containers to be loaded and unloaded with respect to transport vehicles even in very narrow spaces whereby the containers may actually be stored in substantially side-by-side relationship and yet still be accessible for easy loading on a transport vehicle without the aid of supplemental hoist or lift equipment.

BRIEF DESCRIPTION OF THE DRAWINGS

FIG. 1 is a side illustrational view of a pair of cargo containers mounted to the support frames of the transport system of the present invention showing in dotted line the legs associated with one of the frames being lowered to a ground engaging position relative to the trailer of a transport vehicle.

FIG. 2 is a side illustrational view showing one of the containers of FIG. 1 being unloaded with respect to the trailer of the transport vehicle shown in FIG. 1 and showing the alignment cradle mounted to the bed of the trailer.

FIG. 4 is a top plan view showing the cargo container support frame of the present invention when mounted to an underlying alignment cradle which is designed to be mounted on a trailer, railroad car bed or other transport vehicle.

FIG. 5 is a side assembly view showing the frame of FIG. 4 elevated with respect to the underlying alignment cradle and bed of a transport vehicle.

FIG. 7 is a perspective view of the support frame of the present invention shown in a self-supporting position.

FIG. 8 is an enlarged rear elevational view of the support frame of the present invention supporting a cargo container with respect to the bed of a trailer and showing the frame being elevated by the lift assemblies mounted thereto.

FIG. 14 is a top plan view of the support frame and scissor lift assembly of FIG. 13.

DESCRIPTION OF THE PREFERRED EMBODIMENTS

Figure 3:
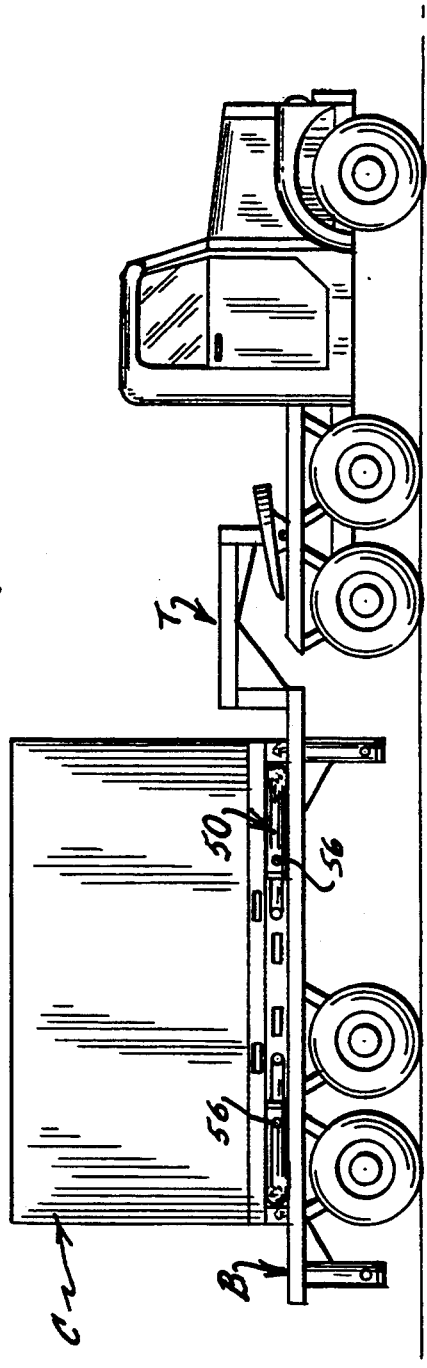
FIG. 3 is a side illustrational view of another type of transport vehicle for hauling a single container and support frame within the teachings of the present invention.

With continued reference to the drawing figures, the transporting and support system of the present invention is designed for use with heavy duty cargo containers of the type which are utilized for short and long distance hauling, shipping and/or storage. In the drawing figures, the cargo containers will be shown as being transported on conventional low bed trailers "T" pulled by a conventional truck tractor. It should be noted that other types of motor vehicles may be utilized with the system of the present invention including other types of trucks, railway vehicles, and ships. As noted in the drawing figures, one or more cargo containers may be loaded on a given transport vehicle. In FIG. 1, two such containers are mounted to the bed "B" of the trailer "T".

The support assemblies of the present invention include a primary support frame 30 having end portions 31 and 32 and an intermediate portion 33. With specific reference to FIG. 4, in one embodiment, the frame 30 includes a pair of longitudinally extending side rails or beams 34 and 35 which are welded or otherwised secured at their ends to hollow transverse beams 36 and 37. The center portion 33 of the main frame may be reinforced by providing upper and lower plates 38 which are welded or otherwise secured to the longitudinally extending rails 34 and 35.

A pair of open channels 39 are provided in the side rails 34 and 35 and extend between the plates 38 so as to provide openings for accepting the forks of a lift mechanism such as a forklift. The outer portions of the frame are reinforced by cross bracing 40 which is welded between the rails 34 and 35.

As more particularly shown in FIGS. 4 and 7, the end portions of the frame between the rails 34 and 35 are generally hollow allowing the selective placement of slidable ramps 42. The ramps are retained within these spaces by the cross bracing 40. The ramps are slidable with respect to an elongated opening 43 provided through the end beams 36 and 37. Although, only one ramp is shown in FIG. 7, a ramp may be provided within both end portions 31 and 32.

In order to secure the support frames with a container "C", brackets 44 are welded or otherwise secured at each of the corners defined by the ends of the beams 36 and 37. Mounted to each bracket 44 is a locking pin assembly 45 having an upwardly extending pin element 46. The pin elements 46 are engagable within receivers or corner castings 47 provided at each corner of the cargo container "C". The pins 46 have non symmetrical heads and are rotatably by a suitable handle (not shown) attached thereto. When the handle is pivoted horizontally, the head of the pin 46 is rotated so as to lock within the opening in the corner castings 47. One suitable type of locking mechanism is a SCHULZ® TWISTLOCK TYPE F26NS.

Figure 6:
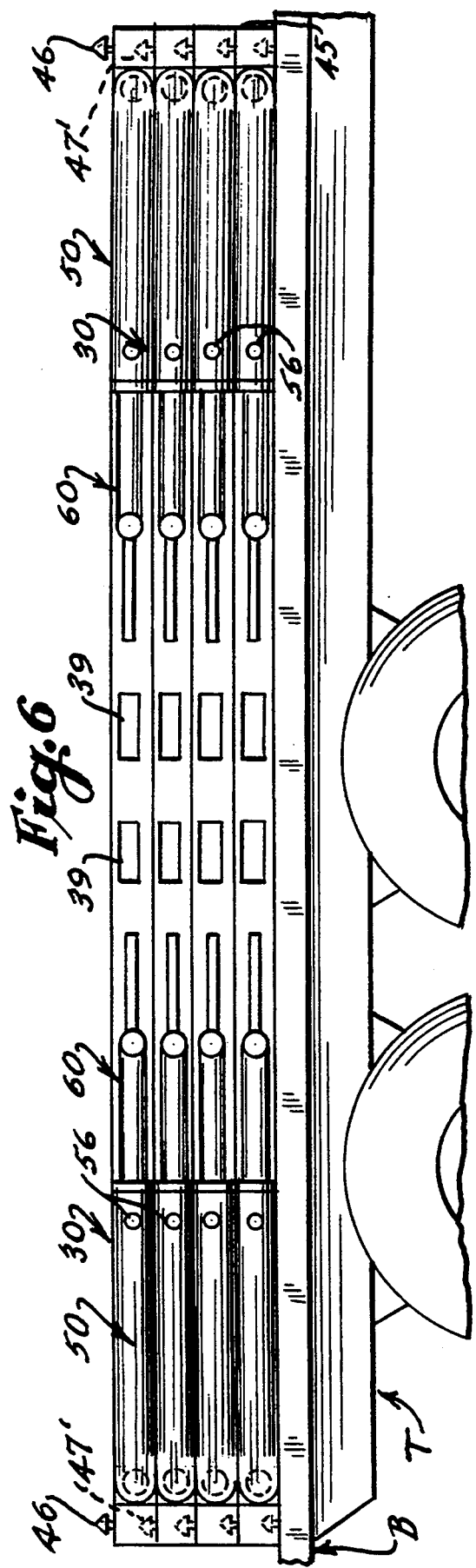
FIG. 6 is a side illustrational view showing a plurality of cargo support frames mounted in interlocked relationship and being transported on a trailer of a transport vehicle.

The locking pin assemblies further include, at their base, receivers or corner castings 47' which are similar to the receivers on the containers. These are shown in dotted line in FIG. 6 and are for purposes of allowing a vertical stacking and interlocking of a plurality of frames for transport by a common carrier such as a tractor trailer.

With continued reference to FIGS. 4 and 7, in order to support the frame 30 from the ground, a leg assembly 50 is provided at each corner of the frame. The leg assemblies include an outer housing 51 and telescoping inner housings 52 and 53. An enlarged support pad 54 is mounted at the base of the telescoping portion 53. A plurality of selectively aligned openings 55 are provided through each of the leg assembly sections 51, 52 and 53 and a locking pin 56 is provided for locking the components when a selective set of openings are aligned. Each leg assembly is mounted on a pivot 57 secured to a moveable outrigger beam 58 which is slidably received within one of the end beams 36 and 37. In this respect, each leg assembly 50 is designed to be positioned generally horizontally and in a retracted position beneath the cargo container during shipment as shown in FIGS. 1–4. However, when the leg assemblies are extended outwardly of the frame and pivoted vertically, as shown in FIGS. 7 and 8, the leg assemblies are extended to support the frame 30 thereof allowing the frame and container to be raised and removed from the bed "B" of the trailer "T". Further, it is necessary to extend the legs outwardly relative to the frames so as to provide clearance to maneuver the trailer beneath the frame without accidentally hitting the legs.

Each leg assembly 50 is stabilized by a reinforcing strut assembly 60 having an outer housing 61 and a telescoping arm 62 having its outer end pivotally secured at 63 to the leg assembly 50. The upper end of the strut is pivotably connected at 63 to a locking bar or pin 65 which is slidably carried in a support sleeve 66 which is secured to the side rails 34 and 35, such as by welding. The sleeves are reinforced by plates 68 which are welded thereto and which extend outwardly therefrom diagonally to the side rails 34 and 35. Each arm 62 may be resiliently urged outwardly of its housing 61, and, when the leg assemblies are in proper position, a retention pin 64 is provided to retain the arms in extended position. Also, a plurality of spaced openings 67 are provided in the locking bar or pin 65 which are alignable within an opening in the sleeve 66. When the strut assembly has been pulled outwardly from the frame a selected distance, a retention pin 67' is extended through the opening in the sleeve and in the aligned opening in the locking bar or pin to thereby retain the strut in extended position.

Figure 7A:
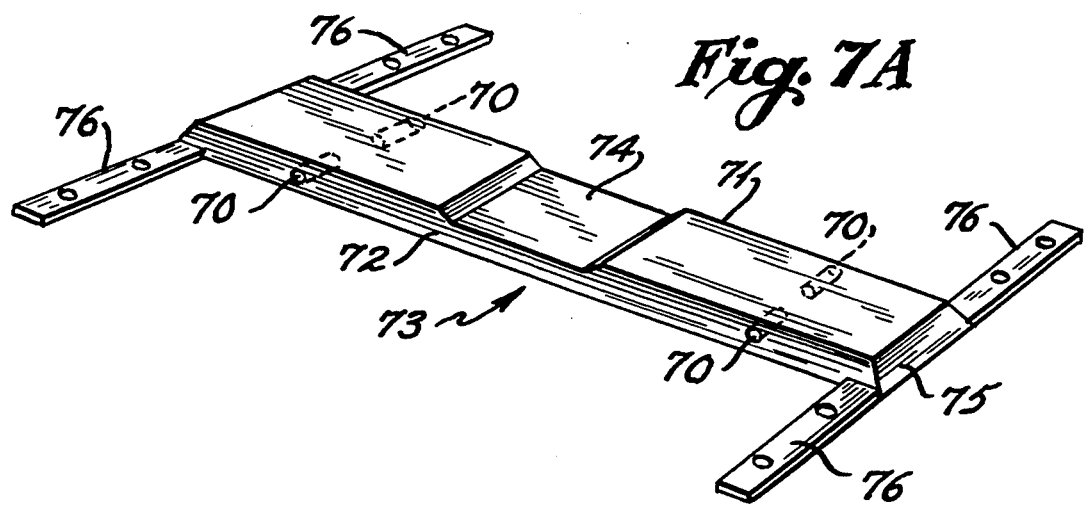
FIG. 7A is a perspective view of one embodiment of alignment cradle of the present invention.

With reference to FIG. 4, it should be noted that the locking pin 65 passes through opposing openings 69 in the longitudinal rails 34 and 35 and will enter into aligned openings 70 provided in the side rails 71 and 72 of an alignment cradle 73. The alignment cradle is shown in FIG. 7A and is generally formed of a hollow steel frame which includes the elongated side rails 71 and 72 which are sloped outwardly so that a cross section taken through the alignment cradle is generally trapezoidal in configuration. In this manner, as the main frame is raised or lowered, respectively, with respect to the alignment cradle, the sloped side rails 34 and 35 will cooperatively engage with the sloped sides 71 and 72 of the alignment cradle thereby ensuring that the main frame is properly positioned with respect to the alignment cradle. With the main frame seated upon the alignment cradle, the locking pins 65 will extend through the openings 69 in the main frame and into the openings 70 of the alignment cradle thereby positively securing the main frame to the alignment cradle.

As shown in FIG. 7A, the alignment cradle further includes a central portion which is generally recessed as shown at 74. The recess is located beneath the openings 39 formed in the rails 34 and 35 of the main frame to thereby allow clearance for forklift arms which can be inserted into the main frame to lift the main frame from the alignment cradle. The ends of the alignment cradle further include sloped end walls 75 and outer mounting plates 76. The mounting plates 76 are utilized to secure the alignment cradle to the bed of the vehicle either by mechanical fasteners, such as rivets or bolts, or by selective attachment for temporary use by belts or other fastening devices. In an alternate embodiment, the alignment cradle will take a slightly different configuration and will actually become part of the trailer undercarriage as will be discussed in greater detail here-inbelow.

Figure 10:
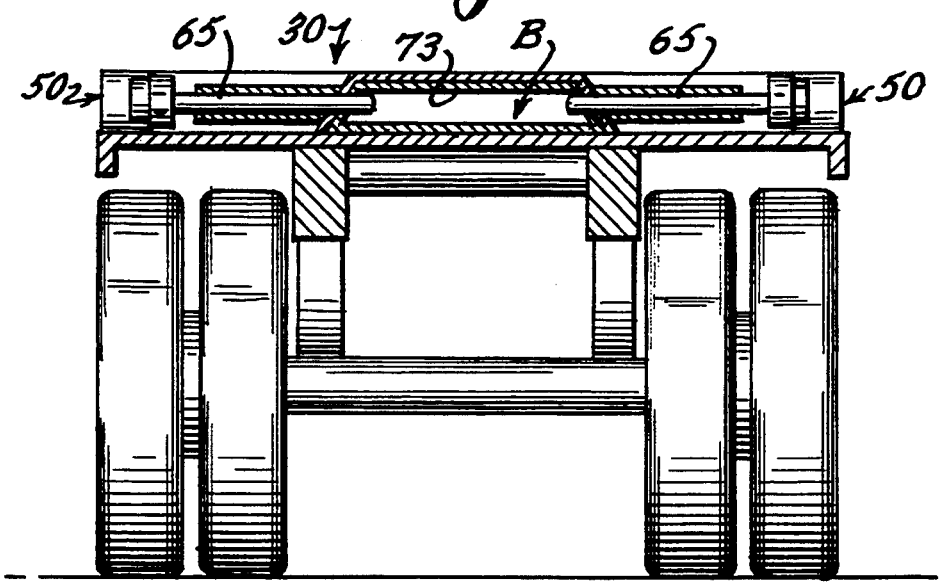
FIG. 10 is a cross sectional view showing the locking arrangement between the support frame and the alignment cradle mounted to the trailer of the transport vehicle.

In order to allow the container to be removed from the bed of the trailer or other transporting vehicle, the main frame 30 includes a first set of compact hydraulic cylinders 80 having short thrust extendable pistons 81. The pistons 81 need only be several inches in length as it is only necessary for a limited clearance to be provided between the frame and the bed of the trailer to allow the legs 50 to be cantilevered from the end beams 36 and 37 and thereafter rotated into a vertical position, as shown in FIGS. 8 and 10. The legs are extended outwardly a sufficient distance to allow clearance for maneuvering the vehicle beneath the frame. With the pins 56 removed from the leg assemblies, the telescoping sections 52 and 53 are allowed to descend until the pads 54 engage the ground. Thereafter, the pins are reinserted through aligned openings 55 in the leg assemblies and the legs locked in vertically adjusted position. During the movement of each leg assembly, the strut 60 is also pulled from the main frame disengaging the locking pin 65 from the alignment cradle while simultaneously allowing the telescoping arm 62 of the strut assembly 60 to be extended. Once the legs are properly vertically aligned, the retention pins 64' and 67' are inserted to retain the strut assembly in its extended position thereby reinforcing and bracing each leg assembly at the corners of the main frame. In some instances the strut assemblies may be extended independently of the legs with appropriate attachment means being provided to connect the struts to the legs.

Once each leg and strut assembly have been properly locked into place, the hydraulic cylinders 80 are reactivated withdrawing the pistons 81 thereby allowing the container "C" to be supported only by the frame 30. As the frame remains elevated several inches (2 to 5, generally) above the truck bed "B" it is only necessary for the operator to drive the trailer from under the frame 30 so that the vehicle may be put to further use while the container is being loaded, unloaded or temporarily stored.

Figure 11:
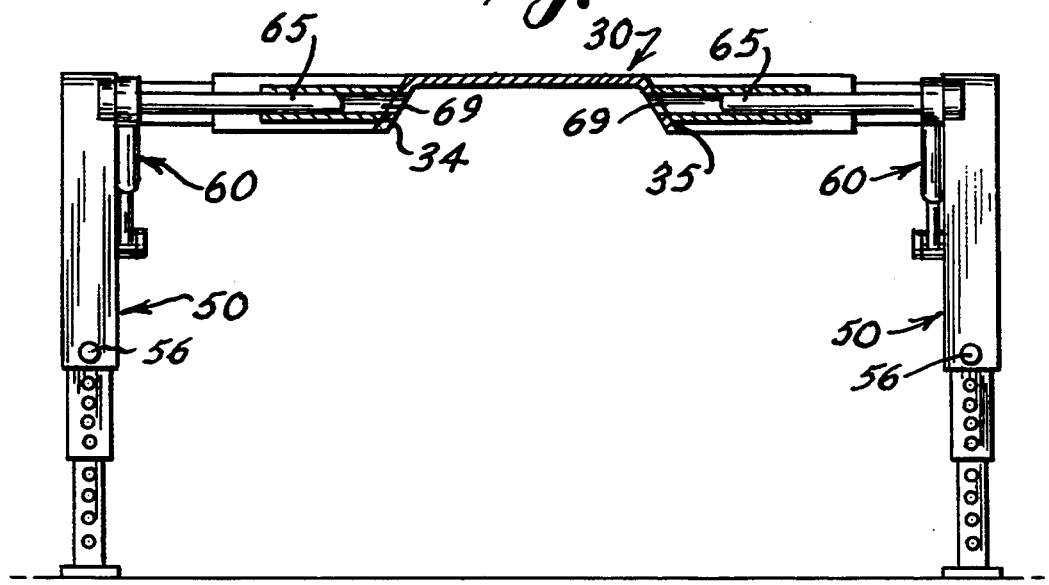
FIG. 11 is a cross sectional view similar to that of FIG. 10 showing the main frame in free standing position with the trailer being removed.
Figure 13:
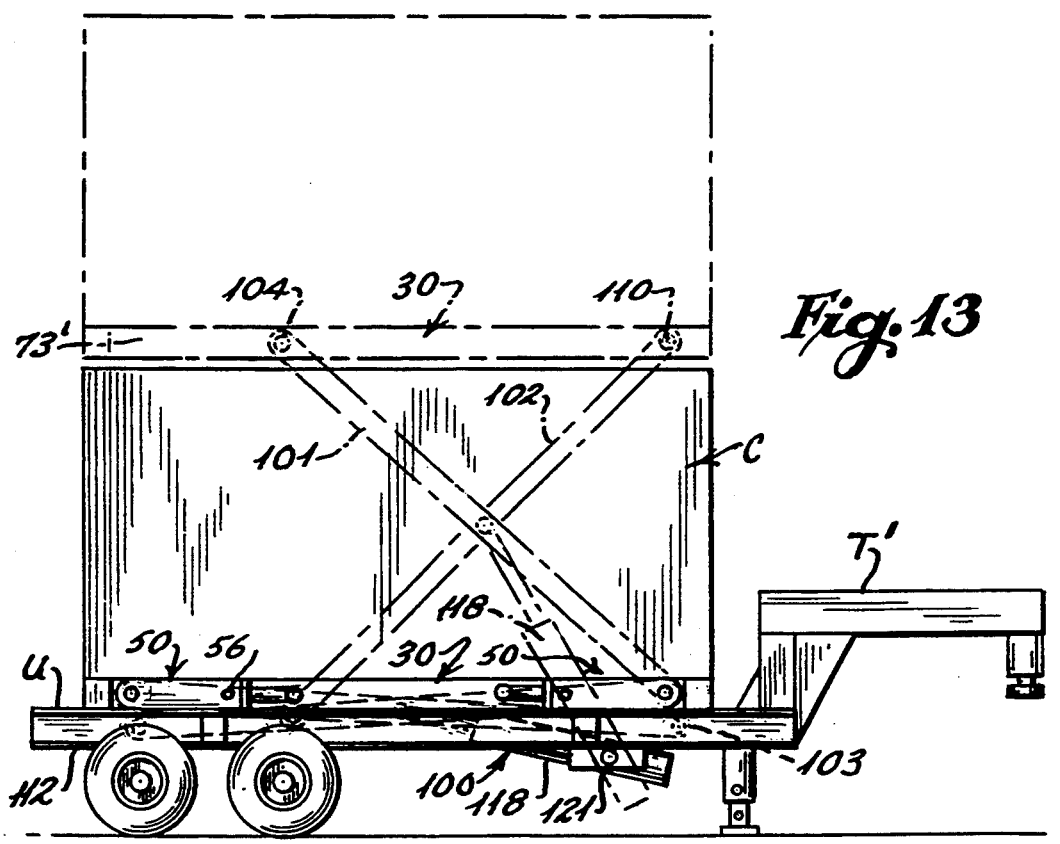
FIG. 13 is a side illustrational view of another embodiment of the present invention for use on low bed hauling trailers wherein the support frame and the alignment cradle are elevated by a scissor lift assembly.

To further show the locking arrangement between the alignment cradle 73 which is secured to the truck bed "B" and the main frame 30, FIG. 10 discloses the locking pins 65 associated with the strut assembly 60 being fully engaged between the aligned openings 69 and 70 in the main frame and the alignment cradle, respectively. With this type of engagement, the frame is positively locked and can not shift either longitudinally nor transversely with respect to the truck bed. Further, this interlocking between the main frame and the alignment cradle is accomplished automatically by raising, rotating and then urging the leg assemblies and the strut assemblies 50 and 60, respectively, inwardly toward the main frame. When the containers are being unloaded as previously discussed with respect to FIG. 8, the locking pins are automatically withdrawn from the aligned openings 69 and 70 in the main frame and the alignment cradle thereby allowing the main frame to be completely released and elevated with respect to the truck bed and the alignment cradle as is shown in FIG. 11.

In order that the support frame of the present transport system may be utilized with substantially any type of transport vehicle, in the preferred embodiments, a separate independent set of lift members are mounted in spaced relationship at the four corners of the frame 30. These lift members are in the form of inflatable air bags or bladders 84 which are mounted within housings 85 which are welded or otherwise secured both to the longitudinal rails 34 and 35 of the frame as well as the cross beams 36 and 37. As with the hydraulic cylinders, when the air bladders are inflated, they will extend below the frame engaging the bed of the transport vehicle and thereby providing lift to raise the frame and any cargo container thereon relative to the bed. After the leg assemblies 50 have been placed into proper support position, the bladders are deflated and the transport vehicle driven from beneath the frame 30 as has been previously discussed with respect to the hydraulic lifts.

Figure 12A:
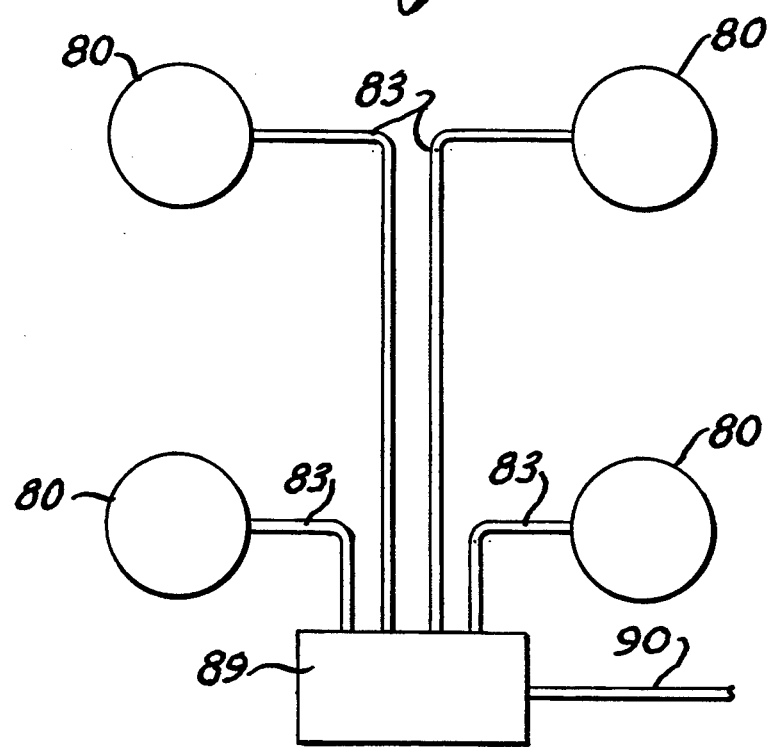
FIG. 12A is a fluid control circuit for supplying hydraulic fluid to the lift devices of the present invention.
Figure 9:
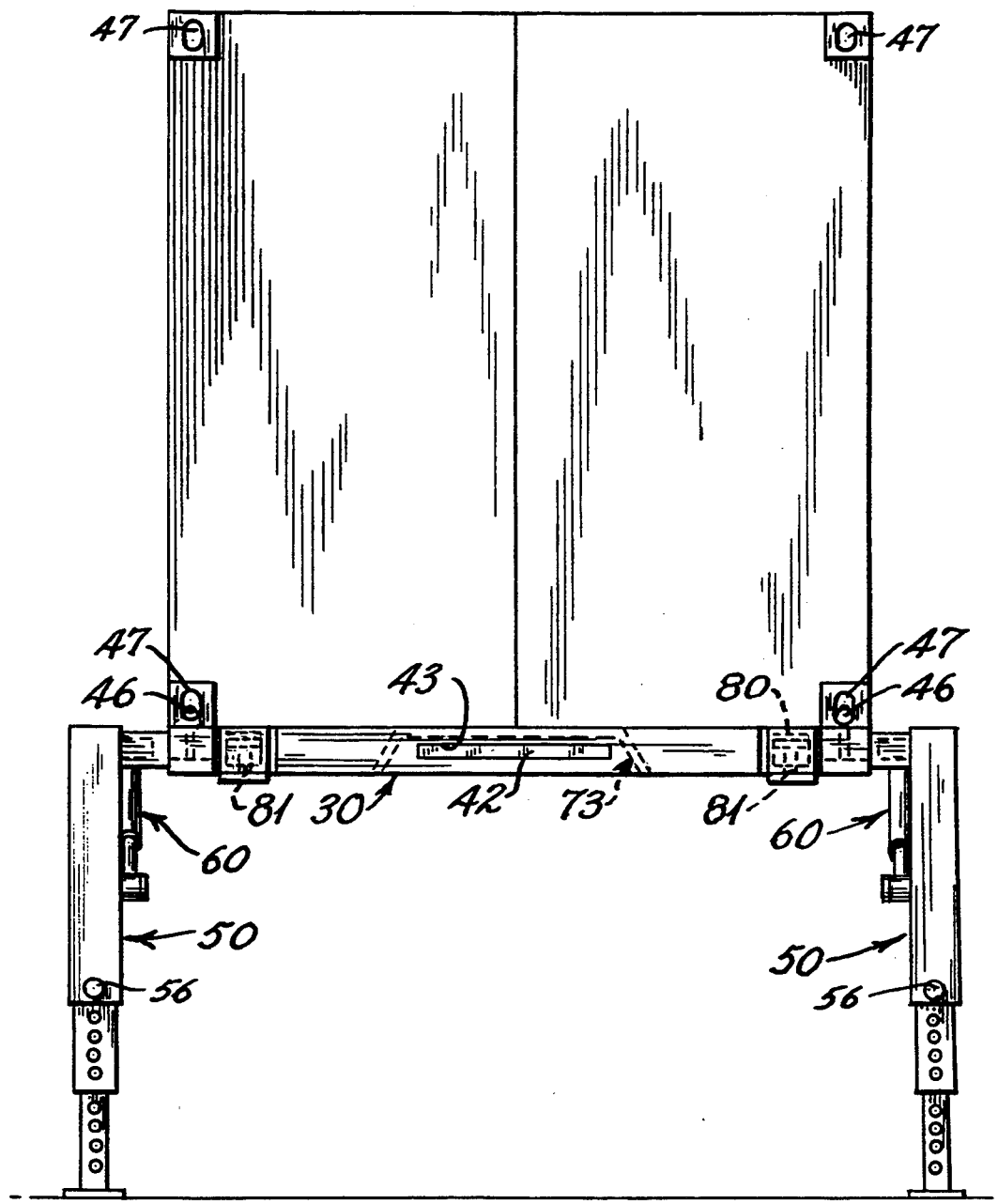
FIG. 9 is a rear elevational view similar to that of FIG. 8 except with the trailer being removed relative to the support frame and cargo container.

In view of the foregoing, the frame 30 of the present invention may be elevated either by the hydraulic cylinders 80 or the air bladders 84. The hydraulic cylinders are connected to a hydraulic control valve, as depicted in FIG. 12A, by way of hydraulic lines 83 with the control valve being connected to a source of fluid supply associated with the transport vehicle. The air bags are connected, when necessary, by way of air lines 87 which extend to a control circuit, shown in FIG. 12B, which is connected to a source of air pressure associated with the transport vehicle.

With respect to FIG. 12A, the hydraulic circuit for controlling the lift cylinders 80 is disclosed. Each lift cylinder is connected by a fluid line 83 to a diverted valve assembly 89. The diverted valve has an inlet/outlet line 90 which is connected directly to the hydraulic system of the transport vehicle. The diverter valve will ensure that each of the cylinders is supplied with, or drained of fluid at an even rate to thereby retain the support frame level during raising and lowering.

Figure 12B:
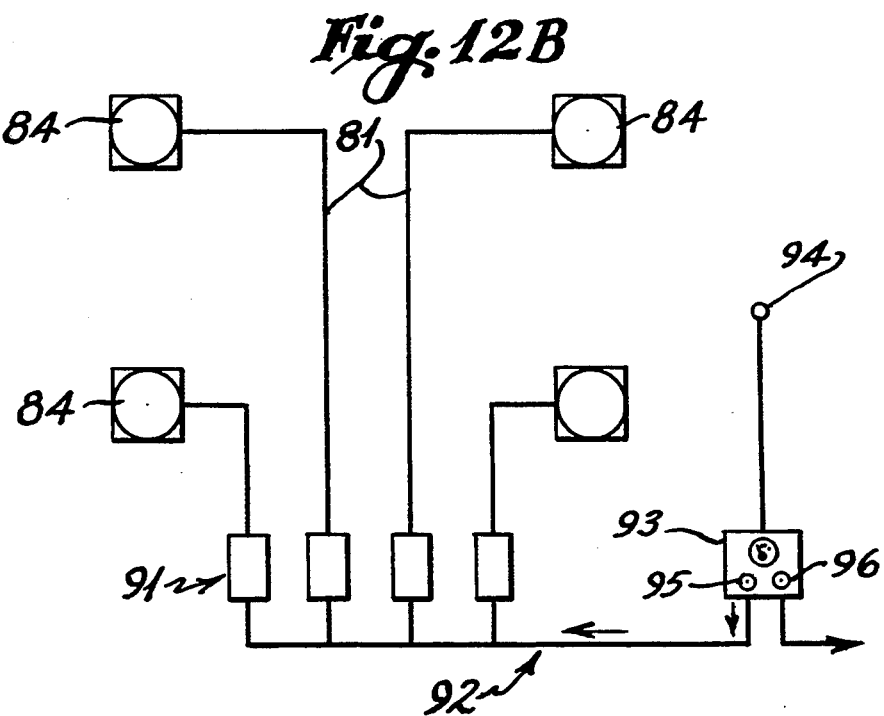
FIG. 12B is a fluid control circuit for supplying pneumatic fluid to the lift devices of the present invention.

FIG. 12B discloses the control circuit for use with the air bladders 84. Each of the air bladders 84 is connected through air lines 87 to a distribution valve 91 which ensures equalization of pressure in each of the lines 87. The distribution valve 91 is connected by a supply line 92 to a control valve assembly 93. The control valve assembly 93 is connected by a quick disconnect coupling 94 to the air brake system of the transport vehicle. The control valve 93 includes an inlet control button 95 and an exhaust control button 96. Although not shown in the drawing figures, the control valve 93 is adjustable to allow a regulation of input and exhaust air to thereby control the rate in which the bladders 84 are expanded and contracted. As with the hydraulic cylinders, it is generally necessary that the air bladders only inflate to a maximum of 2"–5" in order to allow sufficient clearance of the frames relative to the bed of the transport vehicle. In some instances, the air bladders may be utilized when the frame is mounted to the transport vehicle to act as a shock absorbing system, especially if fragile loads are being transported in the cargo containers. When being used as shock absorbers, the bladders need only be partially inflated.

With specific reference to FIGS. 13–18, another embodiment of the invention is disclosed in greater detail. In this embodiment, the frame 30 is designed to be lifted utilizing a scissor lift assembly 100 which is mounted to the undercarriage "U" of a low frame towing vehicle. Such low framed vehicles may have a road clearance height of only 22"–26". Due to the length of the leg assemblies 50, it is not practical to utilize lifting devices such as the compact hydraulic cylinders 80 or the air bladders 84. With the previous embodiments, the bed heights may conventionally be between 40"–51" and in some instances as low as 35"–40". As the frames 30 are designed to be utilized with essentially any type of vehicle, when the frames are to be transported on vehicles having low beds, the beds must be modified to include a scissor lift assembly 100. The scissor lift assembly is utilized to raise the support frame 30 to a height sufficient to extend and rotate the leg assemblies 50 into supporting position.

The scissor lift assembly includes two pairs of vertically pivotable support arms 101 and 102. The pair of support arms 101 are both pivotally mounted in fixed relation to opposite sides of the undercarriage at pivot points 103 and are pivotably mounted at their opposite ends to a movable carriage 104 which is support within opposing channels or tracks 105 defined within in a modified alignment cradle 73' by opposite guide rollers 106. It should be noted with respect to drawing FIGS. 15 and 16 that the modified alignment cradle 73' includes an opening in the lower wall thereof through which the support arms 101 and 102 extend. The alignment cradle includes openings 70' through which the locking pins 65 are slidably received in order to lock the support frame 30 to the alignment cradle 73'. The base of the cradle 73' extends outwardly as shown at 107 to provide additional support for the frame.

The support arms 102 are pivotally attached in spaced aligned relationship at 110 to the forward end of the alignment cradle 73' with their opposite ends being mounted to a carriage assembly 111. The carriage assembly 111 includes a pair of outer rollers 112 which track within opposing channels or tracks 113 which are welded to opposing "I" beams associated with the undercarriage "U".

Each pair of support arms 101 and 102 are pivotally connected at their mid-point about a pivot shaft 114 which is connected to the outer end 115 of a piston member 116 which is controlled by a hydraulic or pneumatic cylinder 118. The cylinder 118 is pivotally mounted about a separate pivot shaft 120 which is suspended on hanger brackets 121 from the "I" beams associated with the undercarriage "U".

Figure 15:
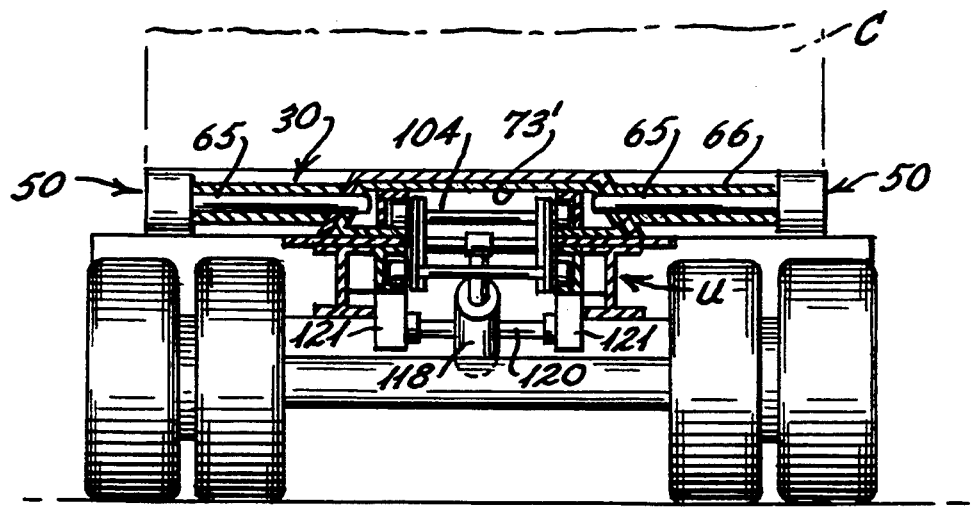
FIG. 15 is a partial cross sectional rear elevational view of the support frame shown in FIG. 13 with the locking pins securing the main frame to the alignment cradle mounted to the scissor lift assembly.
Figure 16:
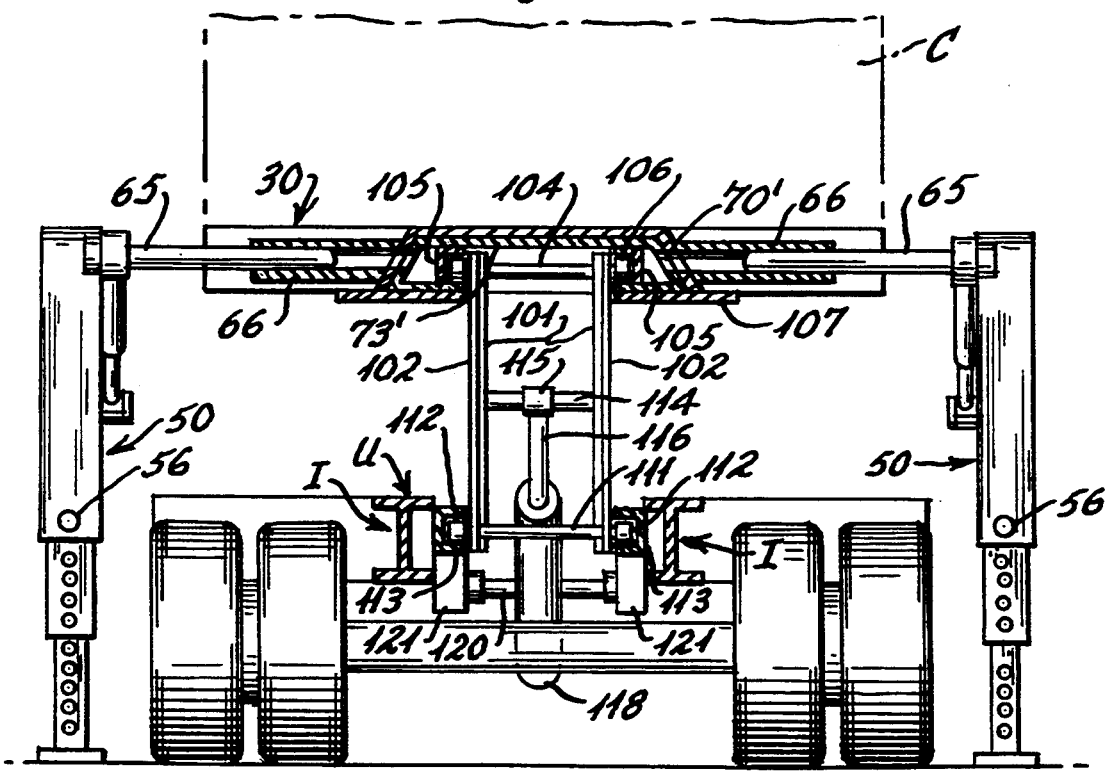
FIG. 16 is a partial cross sectional rear elevational view of the support frame assembly of FIG. 13 showing the frame being elevated to a fully elevated support position by the scissor lift assembly.
Figure 17:
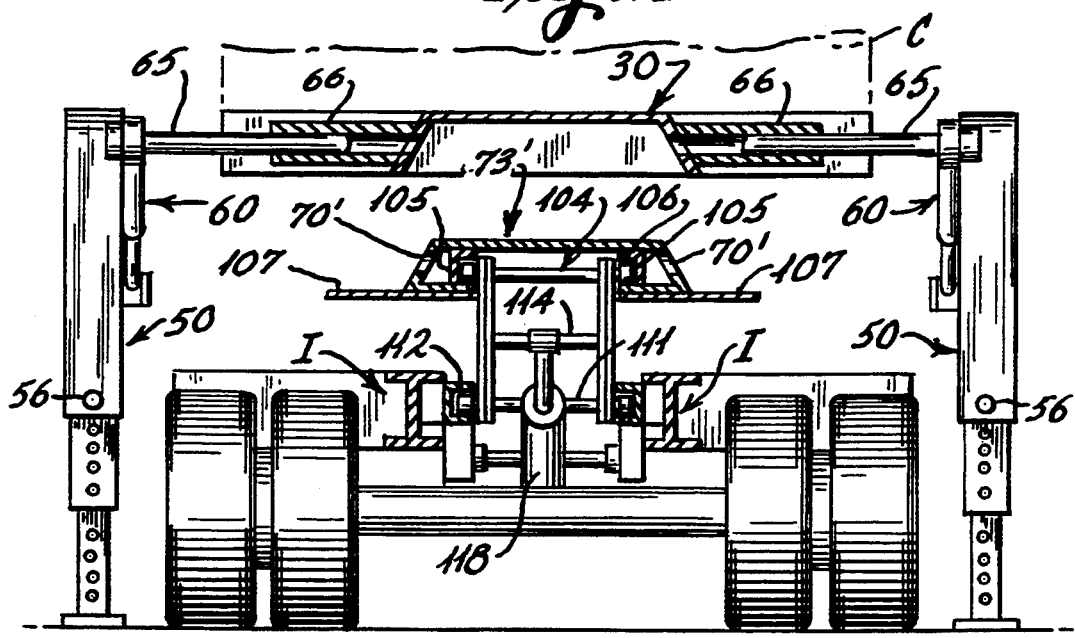
FIG. 17 is a partial cross sectional view of the support frame of FIG. 13 showing the support frame being fully supported relative to the alignment cradle and with the alignment cradle being lowered by the scissor lift assembly.
Figure 18:
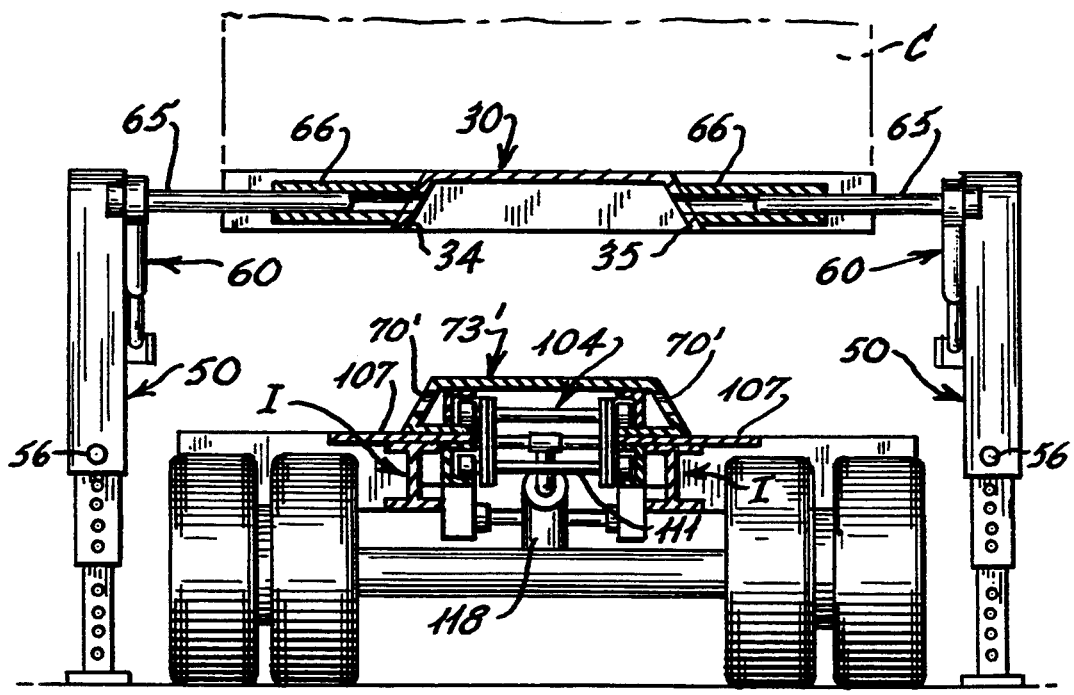
FIG. 18 is a view similar to FIG. 17 showing the alignment cradle in a fully lowered position.

The operation of the scissor lift assembly 100 will be described with reference to the sequence of drawings shown in FIGS. 15–18. In FIG. 15 the scissors lift is shown in a closed configuration with the main frame 30 being locked with the alignment cradle 73'. In this position the leg assemblies 50 are mounted in horizontal relationship to the frame. By activation of the lift cylinder 118 by utilizing controls, similar to those disclosed in FIGS. 12A or 12B, the piston member 116 associated therewith is driven outwardly. As the piston moves outwardly, the carriages 104 and 111 associated with the support arms 101 and 102 track within the channels 105 and 113 as the support arms pivot about the pivot shaft 114. As the arms pivot upwardly, the alignment cradle 73' will lift the frame 30 until a predetermined height is reached at which time the leg assemblies 50 are pulled outwardly from the frame 30 thereby releasing the locking pins 65 from the alignment cradle. The leg assemblies are thereafter vertically adjusted into a support position, as shown in FIG. 16, and are locked in place by the pins 56. With reference to FIG. 17, once the frame 30 is supported by the leg assemblies 50, the scissors lift assembly 100 is activated by retracting the piston 116 within the lift cylinder 118 thereby closing the scissors assembly and allowing the carriages 104 and 111 to track within their opposing channels thereby lowering the alignment cradle 73' with respect to the main frame 30. FIG. 18 shows the scissors assembly in a fully lowered or closed position, with respect to the supported main frame. In this position, the vehicle is now free to be driven from under the frame 30 and the cargo container "C".

Figure 19:
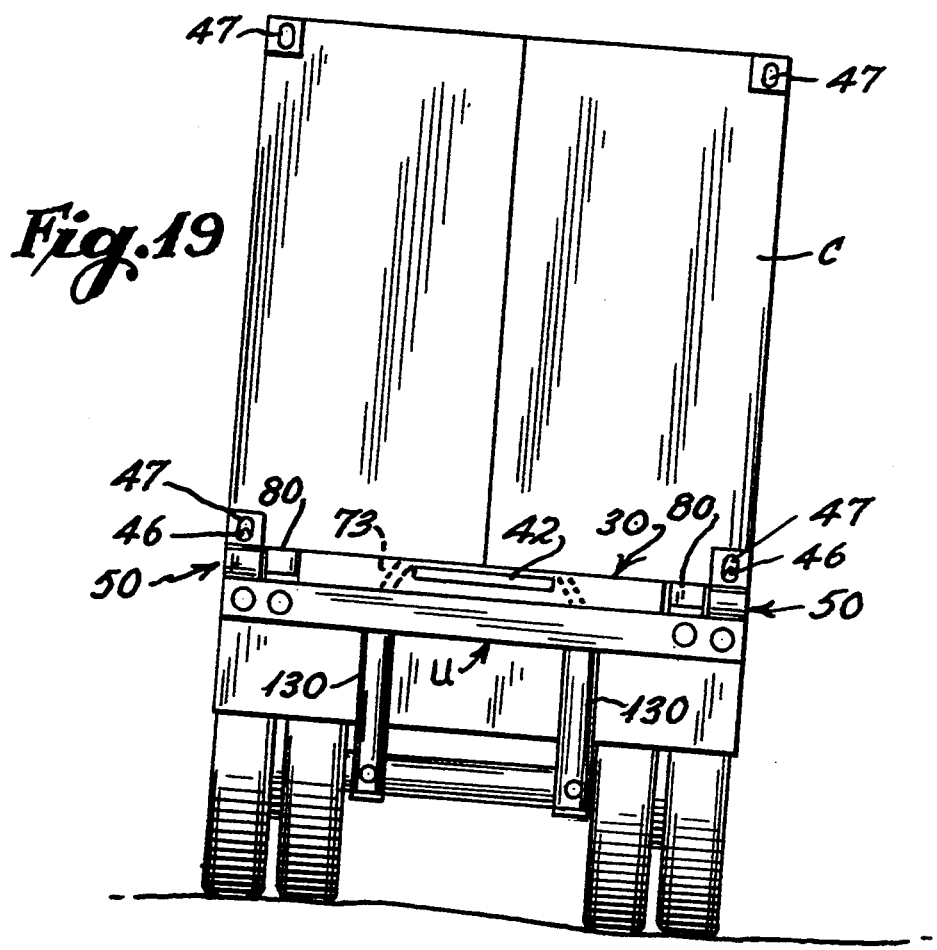
FIG. 19 is a rear elevational view of one of the support frames of the present invention to which a cargo container is mounted relative to the bed of a trailer which is parked on uneven terrain.
Figure 20:
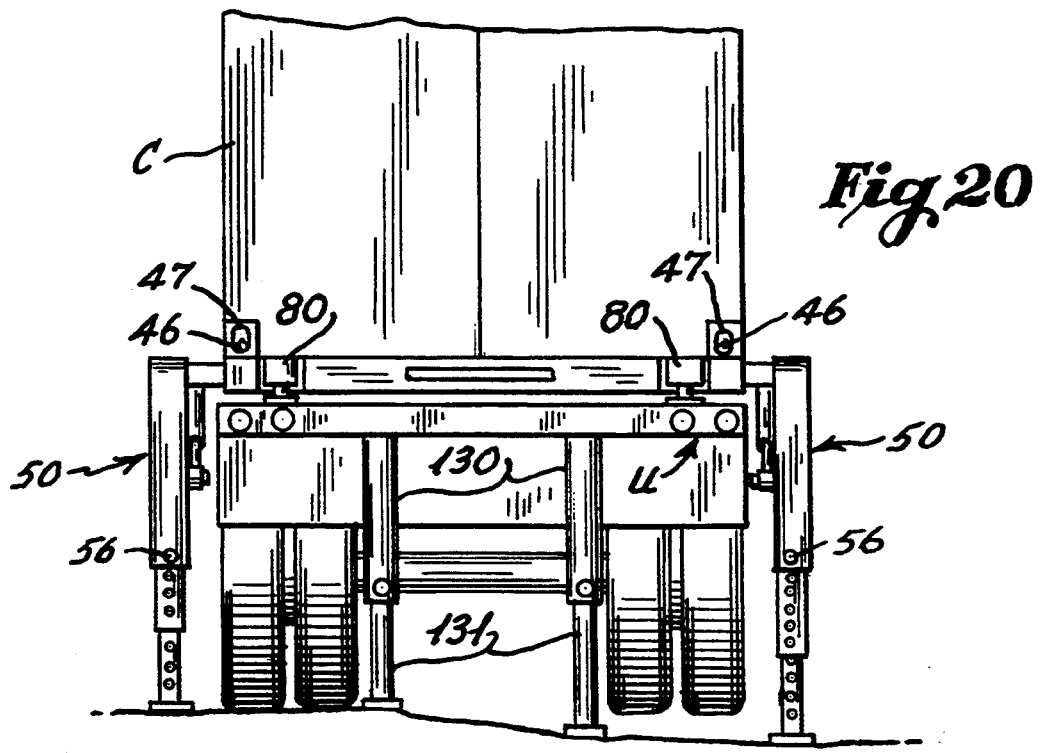
FIG. 20 is a rear elevational view of the trailer shown in FIG. 19 provided with supplemental lift assemblies for retaining the trailer in horizontal alignment relative to the terrain and showing the support frame also being aligned to orient the cargo container level with respect to the uneven terrain.

In instances where containers must be left at locations of uneven terrain, a further embodiment of the present invention provides leveling hydraulic lifts which are associated with the trailers used for hauling the frames and cargo containers. Due to the weight associated with large transport containers, it is necessary that they be loaded or unloaded in a level position. In FIG. 19, a transport vehicle is shown wherein the container is not level due to the ground terrain. In these situations, hydraulic or pneumatic cylinders 130 are provided which are attached to the undercarriage "U" of the transport vehicle. Although only two such cylinders are shown as being vertically mounted to the undercarriage of the vehicle, it is preferred that four spaced cylinders be used. The cylinders should be mounted so as to be generally in vertical alignment with the longitudinal rails 34 and 35 of the support frame. The cylinders must be individually activatable so as to allow the pistons 131 to achieve different extensions in order to properly level the trailer before the leg assemblies 15 are pivoted and locked into position as previously discussed. As the leg assemblies are adjustable to different positions, they will retain the cargo container "C" in a level position even though the ground terrain is not level.

I claim:

1. A system for transporting and supporting cargo containers whereby the containers are hauled on a transport vehicle, the system comprising;
   a. an elevatable frame having an upper surface on which at least one cargo container may be supported and a lower surface, said frame having opposite side portions, and spaced openings in each of said side portions;
   b. an alignment cradle means mounted to the transport vehicle and having a pair of spaced side rails, spaced openings in each of said side rails which align with said spaced openings in said opposing side portions of said frame,
   c. pairs of legs mounted on opposite sides of said frame means for mounting said legs relative to said frame whereby said legs may be moved relative to said frame;
   d. lift means mounted so as to be operable to selectively raise said frame from a vehicle on which said frame is positioned;
   e. locking means movably mounted through said spaced openings in said frame and being extendable through said spaced openings in said cradle means when in a first position relative to said frame and being disengaged from said spaced openings in said cradle means when in a second position relative to said frame, each of said locking means having an outer end portion;
   f. a plurality of strut means mounted in spaced relationship on opposite sides of said frame, each of said strut means having a first end connected to said outer portion of one of said locking means and a second end connected to one of said legs, said locking means being movable from said first position to said second position as said strut means are moved outwardly relative to said frame;
   g. engaging means mounted to said frame for selectively securing a cargo container thereto; and
   h. means for controlling said lift means to raise and lower said frame relative to the bed.

2. The system of claim 1 including a pair of outrigger members extendably mounted outwardly from said opposite side portions of said frame, and said means for mounting said legs being mounted to said outrigger members said locking means are receivable within said spaced openings of said cradle means as said legs and strut means are retracted toward said frame.

3. The system of claim 2 including first pivot means for pivotally connecting said first end of each of said strut means to an adjacent of said legs and a second pivot means for pivotally connecting said second end of each of said strut means to said locking means.

4. The system of claim 3 in which each of said strut means includes at least first and second members which are telescopically movable relative to one another, and means for securing said telescoping members relative to one another.

5. The system of claim 4 in which each of said locking means includes a pin member, each of said pin members being generally parallel with respect to said outrigger members.

6. The system of claim 5 including a pair of spaced guide sleeves mounted on said opposite side portions of said frame, and said pin members being telescopically supported within said guide sleeves.

7. The system of claim 1 in which said lift means includes a first plurality of fluid expansible means mounted to said frame, and a first fluid circuit for connecting said first fluid expansible means to said means for controlling said lift means.

8. The system of claim 7 including a second plurality of fluid expansible means mounted to said frame, and a second fluid circuit for connecting said second fluid expansible means to said means for controlling said lift means.

9. The system of claim 1 including an open space defined within at least one of said end portions of said frame intermediate said upper and lower surfaces, and an extendable ramp slidingly disposed within said space.

10. The system of claim 1 in which said lift means includes a first plurality of fluid expansible means mounted to said frame, and a first fluid circuit for connecting said first fluid expansible means to said means for controlling said lift means.

11. The system of claim 10 including a second plurality of fluid expansible means mounted to said frame, and a second fluid circuit for connecting said second fluid expansible means to said means for controlling said lift means.

12. A system for transporting and supporting cargo containers whereby the containers are hauled on a transport vehicle, the system comprising;

a. an elevatable frame having an upper surface on which at least one cargo container may be supported and a lower surface, said frame having opposite end portions and a pair of elongated, spaced and angularly inclined side rails;

b. a pair of legs mounted on opposite sides of said frame adjacent each end portion thereof, a pair of outrigger members extendably mounted outwardly from opposite sides adjacent each end portion of said frame, means for mounting said legs to said outrigger members whereby said legs are movable relative to said frame;

c. lift means for selectively raising said frame from the transport vehicle;

d. a cradle means mounted to the transport vehicle, said cradle means including a pair of elongated, spaced and angularly inclined side rails, said side rails of said frame being supported in complimentary engagement with said side rails of said cradle means,;

e. a plurality of spaced and aligned openings in said side rails of each of said frame and cradle means, f. locking means slideably received within said aligned and spaced openings of said frame and cradle means for selectively securing said frame to said cradle means;

g. a pair or reinforcing strut means mounted in spaced relationship on opposite sides of said frame, said strut means having a first end secured to an adjacent of said legs and a second end connected to an adjacent of said locking means, and h. means for controlling said lift means to raise and lower said frame.

13. The system of claim 12 in which each of said locking means for selectively securing said frame to said cradle means comprises a pin member for extending through said aligned openings.

14. The system of claim 13 including first pivot means connecting each of said second ends of said strut means to said pin members and second pivot means for connecting each of said first ends of said strut means to said legs.

15. The system of claim 12 in which each of said strut means includes at least first and second strut members which are telescopically movable relative to one another, and means for securing said telescoping strut members relative to one another.

16. The system of claim 13 in which said outriggers members and said pin members are generally parallel with respect to one another, said outrigger members and said pin members being simultaneously extended and retracted relative to said frame.

17. The system of claim 16 including a pair of spaced guide sleeves mounted on opposite sides of said frame, and said pin members being telescopically supported within said guide sleeves.

18. The system of claim 17 including means for selectively locking said pin members in adjusted position relative to said guide sleeves.

19. The system of claim 12 in which said lift means includes a first plurality of fluid expansible means mounted to said frame, and a first fluid circuit for connecting said first fluid expansible means to said means for controlling said lift means.

20. The system of claim 19 including a second plurality of fluid expansible means mounted to said frame, and a second fluid circuit for connecting said second fluid expansible means to said means for controlling said lift means.

21. A system for transporting and supporting cargo containers whereby the containers are hauled on a transport vehicle, the system comprising;

a. an elevatable frame having an upper surface on which at least one cargo container may be supported and a lower surface, said frame having opposite end portions and an elongated central portion having opposite side portions, locking means for engaging the cargo container to said frame;

b. a pair of legs mounted on opposite sides of said frame adjacent each end portion thereof, a pair of outrigger members mounted adjacent each end portion of said frame so as to be extendable outwardly relative to said opposite side portions of said frame, said legs being mounted to said outrigger members so as to be moved outwardly relative to said frame;

c. a cradle means mounted to the transport vehicle said cradle means having an upper surface for cooperatively supporting said frame;

d. lift means mounted to said cradle means and being operable to selectively raise said frame;

e. means for controlling said lift means to raise and lower said cradle means;

f. first spaced openings in each of said side portions of said frame and second spaced openings in said cradle means which are aligned with said first openings;

g. a plurality of locking means slidable within said first and second openings to lock said frame to said cradle means, each of said locking means having an outer portion which is extendable outwardly relative to said side portions of said frame to thereby withdraw said locking means from said second opening to unlock said frame from said cradle means; and h. strut means mounted in spaced relationship on opposite sides of said frame, each of said strut means having a first end secured to an adjacent of said legs and a second end secured to said outer portion of an adjacent of said locking means.

22. The system of claim 21 in which each of said locking means includes a member for extending through said aligned first and second spaced openings.

23. The system of claim 21 in which each of said strut means includes at least first and second members which are extendable relative to one another, and means for securing said members relative to one another.

24. The system of claim 21 in which said side portions of said frame include a pair of elongated, spaced and angularly inclined side rails, said cradle means including a pair of elongated, spaced and angularly inclined side rails, said side rails of said frame being supported in complimentary engagement with said side rails of said cradle means.

25. The system of claim 21 in which said lift means includes a scissor linkage assembly, said cradle means including a lower surface, a pair of opposing tracks mounted to said lower surface of said cradle means, a pair of spaced carriage means movably mounted within said opposing tracks, and said scissor linkage assembly being pivotably connected to each of said carriage means.

26. A system for transporting and supporting cargo containers whereby the containers are hauled on the bed of a transport vehicle, the system comprising;

a. an elevatable frame having an upper surface on which at least one cargo container may be supported and a lower surface, said frame having opposite end portions and an elongated central portion;
b. a pair of legs mounted on opposite sides of said frame adjacent each end portion thereof, means for mounting said legs relative to said frame whereby said legs may be moved relative to said frame;
c. lift means mounted so as to be operable to selectively raise said frame from a bed on which said frame is positioned;
d. engaging means mounted to said frame for selectively securing a cargo container thereto;
e. means for controlling said lift means to raise and lower said frame relative to the bed; and
f. said lift means including a first plurality of fluid expansible means mounted to said frame, a first fluid circuit for connecting said first fluid expansible means to said means for controlling said lift means, a second plurality of fluid expansible means mounted to said frame, and a second fluid circuit for connecting said second fluid expansible means to said means for controlling said lift means.

27. A system for transporting and supporting cargo containers whereby the containers are hauled on a transport vehicle, the system comprising;
a. an elevatable frame having an upper surface on which at least one cargo container may be supported and a lower surface, said frame having opposite end portions and an elongated central portion;
b. a pair of legs mounted on opposite sides of said frame adjacent each end portion thereof, means for mounting said legs relative to said frame whereby said legs may be moved relative to said frame;
c. lift means mounted so as to be operable to selectively raise said frame from a vehicle on which said frame is positioned;
d. engaging means mounted to said frame for selectively securing a cargo container thereto;
e. means for controlling said lift means to raise and lower said frame relative to the bed; and
f. an open space defined within at least one of said end portions of said frame intermediate said upper and lower surfaces, and an extendable ramp slidingly disposed within said space.

* * * * *